United States Patent [19]

Brabetz et al.

[11] 4,278,727

[45] Jul. 14, 1981

[54] ALKAI-SOLUBLE, WATER-RESISTANT BINDERS FOR NON-WOVEN MATERIALS

[75] Inventors: Hartmut Brabetz; Heinz Schäfer; Dieter Gorzel, all of Burghausen, Fed. Rep. of Germany

[73] Assignee: Wacker-Chemie GmbH, Munich, Fed. Rep. of Germany

[21] Appl. No.: 44,667

[22] Filed: Jun. 1, 1979

Related U.S. Application Data

[62] Division of Ser. No. 946,552, Sep. 28, 1978, abandoned.

[30] Foreign Application Priority Data

Oct. 20, 1977 [DE] Fed. Rep. of Germany ....... 2747182

[51] Int. Cl.$^3$ .................. B32B 27/00; B32B 27/10
[52] U.S. Cl. .......................... 428/290; 260/29.6 TA; 260/29.6 H; 428/514
[58] Field of Search ............... 162/168 R; 428/290, 428/274, 514; 210/508; 260/29.6 TA, 29.6 WA, 29.6 H

[56] References Cited

U.S. PATENT DOCUMENTS

| | | | |
|---|---|---|---|
| 2,789,903 | 4/1957 | Lukman et al. | 162/168 R |
| 3,365,410 | 1/1968 | Wesslau et al. | 260/29.6 WB |
| 3,503,916 | 3/1970 | Warson et al. | 260/29.6 TA |
| 3,553,116 | 1/1971 | Kaplan et al. | 260/29.6 TA |
| 3,615,557 | 10/1971 | D'Cruz | 260/8 |
| 3,644,251 | 2/1972 | Wilhelmi | 162/168 R |
| 3,753,958 | 8/1973 | Wingler et al. | 260/31.2 N |
| 4,070,319 | 1/1978 | Carel et al. | 260/29.6 TA |
| 4,075,387 | 2/1978 | Trapasso et al. | 428/290 |
| 4,081,318 | 3/1978 | Wietsma | 162/168 R |
| 4,129,711 | 12/1978 | Viout et al. | 260/29.6 TA |

FOREIGN PATENT DOCUMENTS

| | | | |
|---|---|---|---|
| 1151661 | 7/1963 | Fed. Rep. of Germany | 260/29.6 TA |
| 46-10489 | 3/1971 | Japan | 162/168 R |
| 1468142 | 3/1977 | United Kingdom | 260/29.6 TA |

*Primary Examiner*—Edward J. Smith
*Attorney, Agent, or Firm*—Hammond & Littell, Weissenberger and Muserlian

[57] ABSTRACT

A non-woven material containing from 2% to 25% by dry weight of an alkali-soluble, water-resistant in neutral to weakly acidic solutions, binder for non-woven materials based on an aqueous vinyl acetate copolymer containing protective colloids and optionally emulsifiers and having the following monomer units (1) 50% to 70% of vinyl acetate
(2) 20% to 35% of vinyl esters of higher alkanoic acids and/or higher alkyl esters of acrylic or methacrylic acids, and
(3) 3% to 15% of ethylenically-unsaturated acids, said binder being applied to said non-woven material as an aqueous dispersion and subsequently dried.

8 Claims, No Drawings

ALKAI-SOLUBLE, WATER-RESISTANT BINDERS FOR NON-WOVEN MATERIALS

This is a division of Ser. No. 946,552, filed Sept. 28, 1978, and now abandoned.

BACKGROUND OF THE ART

Binders for non-woven materials based on vinyl acetate copolymers, are known. Such binders, among others, increase the mechanical strength, the wet tear strength and the resistance to dry cleaning and impart a pleasant handle to the non-woven materials produced therewith. When punching sheet-like articles, particularly of circular form, from a continuous web of non-woven materials substantial amounts of scrap may be produced, which, because of the binder content, cannot be recycled to the non-woven material manufacturing process. To be able to do so, it would be necessary again to remove the binder from the non-woven material.

Copolymers which contain carboxyl groups and are soluble in alkali are known. However, such polymers are so sensitive to water that their use as binders for the manufacture of non-woven materials having good wet tear strength is not possible.

The use of alkali-soluble polymeric substances as textile glues (sizes) has been known for a substantial time. As a result of the use of water-jet looms when processing sized yarns, the additional need for sufficient water resistance of these alkali-soluble sizes arose. In German Offenlegungsschrift (DOS) No. 2,162,285, this object was achieved by using, as textile glues, poly-(vinyl acetate/dialkyl maleate/acrylic acid) sizes, dimethyl maleate and/or diethyl maleate being employed as the dialkyl maleate. It is known that such polymers meet the standards to which the water resistance of a yarn sized therewith has to conform when used for water-jet weaving, but they cannot be used as alkali-elutable binders for non-woven materials having good wet tear strength.

OBJECTS OF THE INVENTION

An object of the present invention is the development of a binder for non-woven materials which is removeable with alkalis and which gives the non-woven material a high wet tear strength.

Another object of the present invention is the development of an alkali-soluble, water-resistant in neutral to weakly acidic solutions, binder for non-woven materials consisting essentially of an aqueous vinyl acetate copolymer having a solids content of from 10% to 60% by weight and the following range of monomeric units:

(1) 50% to 70% by weight of the monomer units of vinyl acetate units, (2) 20% to 35% by weight of the monomer units of higher molecular weight ethylenically-unsaturated ester units selected from the group consisting of vinyl esters of alkanoic acids having from 8 to 18 carbon atoms, alkyl esters having from 4 to 18 carbon atoms in the alkyl of acrylic acid, alkyl esters having from 4 to 18 carbon atoms in the alkyl of methacrylic acid, and mixtures thereof, and (3) 3% to 15% by weight of the monomer units of ethylenically-unsaturated acid units selected from the group consisting of alkenoic acids having 3 to 4 carbon atoms, alkenedioic acids having 4 carbon atoms, alkyl monoesters having 1 to 18 carbon atoms in the alkyl of alkenedioic acids having 4 carbon atoms, alkenyl monoesters having from 3 to 6 carbon atoms in the alkenyl of alkanedioic acids having 2 to 6 carbon atoms, and mixtures thereof, and containing from 0.5% to 10% by weight, based on the monomer units of protective colloids and from 0 to 6% by weight, based on the monomer units of emulsifiers.

These and other objects of the invention will become more apparent as the description thereof proceeds.

DESCRIPTION OF THE INVENTION

The invention relates to binders for non-woven materials which are soluble in aqueous alkalis but are resistant to aqueous neutral or weakly acidic solutions, and are based on aqueous vinyl acetate copolymer dispersions with solids contents of between 10% and 60% by weight, characterized in that the polymer resin consists of 50% to 70% by weight of vinyl acetate units, 20% to 35% by weight of units of alkanoic acid vinyl esters with 8 to 18 carbon atoms in the alkyl group of the acid and/or acrylic or methacrylic acid alkyl esters with 4 to 18 carbon atoms in the alkyl group, and 3% to 15% by weight of ethylenically-unsaturated monocarboxylic acids and/or dicarboxylic acids with 3 to 4 carbon atoms or monoesters of the latter with alkyl groups having between 1 and 18 carbon atoms and/or monoesters of saturated dicarboxylic acids with 2 to 6 carbon atoms and unsaturated alcohols with 3 to 6 carbon atoms, and contains 0.5% to 10% by weight of protective colloids and up to 6% by weight of emulsifiers.

More particularly, the present invention relates to an alkali-soluble, water-resistant in neutral to weakly acidic solutions, binder for non-woven materials consisting essentially of an aqueous vinyl acetate copolymer having a solids content of from 10% to 60% by weight and the following range of monomeric units:

(1) 50% to 70% by weight of the monomer units of vinyl acetate units, (2) 20% to 35% by weight of the monomer units of higher molecular weight ethylenically-unsaturated ester units selected from the group consisting of vinyl esters of alkanoic acids having from 8 to 18 carbon atoms, alkyl esters having from 4 to 18 carbon atoms in the alkyl of acrylic acid, alkyl esters having from 4 to 18 carbon atoms in the alkyl of methacrylic acid, and mixtures thereof, and (3) 3% to 15% by weight of the monomer units of ethylenically-unsaturated acid units selected from the group consisting of alkenoic acids having 3 to 4 carbon atoms, alkenedioic acids having 4 carbon atoms, alkyl monoesters having from 1 to 18 carbon atoms in the alkyl of alkenedioic acids having 4 carbon atoms, alkenyl monoesters having from 3 to 6 carbon atoms in the alkenyl of alkenoic acids having 2 to 6 carbon atoms, and mixtures thereof, and containing from 0.5% to 10% by weight, based on the monomer units, of protective colloids and from 0 to 6% by weight, based on the monomer units, of emulsifiers.

The use of the binders of the invention makes it possible to again dissolve the synthetic resin binder out of the scrap after the punching process, and thus to find renewed use for the punching scrap by recycling to the production of the non-woven materials. The binders are particularly effective for application to cellulosic non-woven materials.

The binders exhibit good properties if units of isononanoic acid vinyl ester and/or n-butyl acrylate are employed as the units of alkanoic acid vinyl esters and acrylic or methacrylic acid alkyl esters respectively. The use of crotonic acid as the ethylenically unsaturated monocarboxylic acid and of hydroxyethylcellulose and/or polyvinyl alcohol as the protective colloids has proved particularly advantageous.

The binders can be used for the manufacture of non-woven materials. A particular embodiment is the manufacture of non-woven filters using the binders according to the invention, particular interest residing in the manufacture of cellulose non-woven filters. The binders are employed in amounts of from 2% to 25% by dry weight of the non-woven material.

The binders according to the invention are distinguished by the fact that on the one hand they are not dissolved by aqueous neutral or weakly acid solutions but on the other hand can be eluted or washed out by aqueous alkaline solutions, such as, for example, sodium carbonate solution. In addition, the non-woven filters treated with the binders according to the invention are distinguished by good wet tear strength.

The aqueous polymer resin dispersions are in general manufactured in a stirred polymerization autoclave with heating and cooling equipment. The requisite amount of protective colloid and emulsifier, if any, is first introduced as a solution in the aqueous phase. After flushing with nitrogen, a part of the monomer mixture and an equivalent part of the peroxide catalyst are added to the initial charge and the mixture is warmed to 45° to 65° C. The metering-in of the reducing component of the redox catalyst in dilute aqueous solution is then started. The metering-in of the reducing component is carried out in such a way that it only terminates after the end of the metering-in of the monomer mixture. The metering-in of the monomer mixture is started when the internal temperature of the polymerization batch has risen to at least 75° C. Preferably, the polymerization is carried out at temperatures between 75° and 85° C. After completion of the metering-in of all reactants the polymerization is continued for 2 hours at 90° C. and the mixture is then cooled. Grit-free and coagulate-free dispersions with solids contents of up to 60% by weight are obtained Viscosities of 300 to 500 mPas (Epprecht rheometer at 20° C., measuring cup C, stage III) are preferred.

Suitable protective colloids for use in the polymerization are partially saponified polyvinyl acetates having a degree of hydrolysis of between 74 and 97 mol %, water-soluble cellulose derivatives, such as, for example, carboxymethylcellulose, carboxypropylcellulose, hydroxypropylcellulose, polyvinylpyrrolidone, polyacrylic acids, polyacrylamide, water-soluble polyacrylic acid-and polyacrylamide copolymers, methylcellulose, gelatine, casein and water-soluble starch products. Preferably, partially saponified polyvinyl acetate having a degree of hydrolysis of 81 to 94 mol %, and/or water-soluble hydroxyethylcellulose, are employed. The protective colloids are added to the polymerization batch in amounts of 0.5% to 10% by weight, based on the weight of the monomers.

Suitable emulsifiers are alkylarylsulfonates, alkylsulfates, sulfates of hydroxyalkanols, sulfonated fatty acids, sulfates and phosphates of alkyl- and alkylaryl-polyethoxyalkanols, addition products of 5 to 50 mols of ethylene oxide to straight-chain and branched-chain alkyl alcohols with 6 to 22 carbon atoms or to alkylphenols, and block copolymers of ethylene oxide and propylene oxide. Alkylsulfonates, sulfosuccinic acid monoesters and diesters, isotridecyl alcohol polyethyleneglycol ether and nonylphenol polyethyleneglycol ether are particularly suitable. The emulsifiers, if employed, are added to the polymerization batch in amounts of up to 6% by weight.

Suitable catalysts are water-soluble redox catalyst systems with oxidizing peroxide components such as inorganic peroxides, for example hydrogen peroxide or potassium peroxy-disulfate, or organic peroxides such as tertiary butyl hydroperoxide, and with inorganic sulfur compounds in which sulfur is in an oxidation state of up to 6, such as, for example, sodium formaldehyde-sulfoxylate, as the reducing component. A further suitable reducing component is a palladium sol together with hydrogen, in the presence of traces of heavy metals. The catalysts are employed in amounts of between 0.1% to 1% by weight of the total dispersion.

The monomers which are copolymerized are vinyl acetate as the basic monomer, used in amounts of 50% to 70% by weight of the monomers and 20% to 35% by weight of the monomers of units of alkanoic acid vinyl esters with 8 to 18 carbon atoms in the alkyl group of the alkanoic acid, such as, for example, i-nonanoic acid vinyl ester, vinyl laurate, 2-ethylhexanoic acid vinyl ester, Versatic® acid vinyl ester (Versatic acids are mixtures of secondary and tertiary alkanoic acids having various chain lengths. Versatic acid (9 11) has from 9 to 11 carbon atoms) and/or acrylicor methacrylic acid alkyl esters with 4 to 18 carbon atoms in the alkyl group, such as, for example, n-butyl acrylate and 2-ethylhexyl acrylate. Preferably i-nonanoic acid vinyl ester and/or n-butyl acrylate are employed. When mixtures of both types of esters are employed, the ratio of vinyl esters to acrylic esters is from 1:100 to 100:1. In addition, 3% to 15% by weight of the monomers of ethylenically-unsaturated monocarboxylic acid and/or dicarboxylic acids with 3 to 4 carbon atoms, such as alkenoic acids for example, crotonic acid, acrylic acid, or metacrylic acid, alkenedioic acids, for example, fumaric acid or maleic acid, or monoesters of the alkene-dicarboxylic acids with alkyl groups having between 1 and 18 carbon atoms, and/or monoesters of alkanedicarboxylic acids with 2 to 6 carbon atoms and unsaturated alcohols (alkenols) with 3 to 6 carbon atoms are employed, such as, for example, adipic acid monoallyl ester or succinic acid monoallyl ester.

Known regulators, for example aldehydes, organic halogen compounds, mercaptans or nitro compounds may also be present during the polymerization, in order to regulate the molecular weight.

To regulate the pH value during the polymerization reaction, customary buffer systems such as sodium bicarbonate, sodium acetate, trisodium citrate and secondary and tertiary phosphates, such as, for example, disodium hydrogen phosphate or trisodium phosphate, pyrophosphates and polyphosphates, such as tetrasodium pyrophosphate, sodium tripolyphosphate and sodium hexametaphosphate, may be added.

The elutability and wet tear strength were tested using filter paper (No. 850/60 from Machery and Nagel), weighing about 68 gm/m$^2$, by impregnating the filter paper for one minute with a dispersion having a solids content of 10% to 15% by weight, then squeezing off on a padder (100 N/cm linear pressure, 1 m/minute running speed, at room temperature), drying for one and a half hours at room temperature and then drying for half an hour at 100° C. The amount of binder taken up was determined by difference from weighing under standard climatic conditions.

To test the elutability, 2 to 2.5 gm of filter paper containing binder were boiled in 1 liter of a 2% strength aqueous sodium carbonate solution ($Na_2CO_3.10H_2O$) for 30 minutes, then rinsed twice for 2 minutes with hot water at 60° to 70° C. and once for 5 minutes with cold water, and thereafter dried for half an hour at 100° C. The dried samples were weighed under standard climatic conditions.

The wet tear strength was tested in accordance with DIN 53,857. The maximum tensile force N was determined from 5 values in the lengthwise direction and 5 values in the crosswise direction. The length between clamps was 100 mm, and the width of the sample 15 mm.

The low water solubility of the binder in neutral or weakly acid solutions can be determined in the same way by the difference between weighings under defined conditions before and after the treatment with neutral or weakly acid aqueous solutions.

When using the binders according to the invention in non-woven materials, the wet tear strength showed excellent values both in the lengthwise and in the crosswise direction. The solubility in neutral or weakly acid solutions is so low that the non-woven materials containing the binders can be employed for foodstuffs purposes. The elutability of the binder with alkaline aqueous solutions permits regenerating the cellulose from the punching scrap.

The following examples are illustrative of the practice of the invention without being limitative in any respect.

EXAMPLE 1

38.3 parts by weight of water, 3 parts by weight of a substantially saponified polyvinyl alcohol having a degree of hydrolysis of 87.5 mol %, 0.04 parts by weight of a secondary alkylsulfonate with 12 to 15 carbon atoms in the alkyl group and 0.54 part by weight of an isotridecyl alcohol etherified with 15 mols of ethylene oxide were introduced into a reactor equipped with a reflux condenser, stirrer, metering devices, nitrogen inlet and heatable and coolable jacket. After flushing with nitrogen, 21% by weight of the monomer solution, which consists of 29.7 parts by weight of vinyl acetate, 12 parts by weight of isononanoic acid vinyl ester, 3.8 parts by weight of n-butyl acrylate, 2.4 parts by weight of crotonic acid and 0.1 part by weight of t-butyl hydroperoxide, were introduced into the receiver and the reaction mixture was warmed. The metering of the reducing component, which is composed of 10 parts by weight of water, 0.06 part by weight of sodium formaldehyde-sulfoxylate and 0.06 part by weight of sodium bicarbonate, was started at a temperature of the reaction mixture of 55° C. The metering of the reducing component was carried out in such a way that it was completed one hour after the monomer addition was completed.

The metering-in of the monomer solution was started at an internal temperature of 80° C. The polymerization was carried out at a temperature of the reaction mixture of 78° to 82° C. When everything had been metered in, polymerization was continued for 2 hours at 90° C. and the mixture was then cooled. A stable, grit-free and coagulate-free dispersion was obtained, which had a solids content of 50% by weight and a viscosity of 400 mPas (Epprecht rheometer at 20° C., measuring cup C, stage III).

EXAMPLE 2

A dispersion was prepared analogously to Example 1 with a polymer resin consisting of 59.1% by weight of vinyl acetate units, 31.4% by weight of n-butyl acrylate units and 4.8% by weight of crotonic acid units. The protective colloid employed here was 1.9% by weight of hydroxyethylcellulose, while the emulsifier employed was an alkylphenol/ethylene oxide addition product with 23 ethylene oxide units per alkylphenol, the alkylphenol containing 9 carbon atoms in the alkyl.

EXAMPLE 3

(Comparative Example 1)

In order to demonstrate the superiority of the binders according to the invention over products which do not contain any units of alkanoic acid vinyl esters with 8 to 18 carbon atoms in the alkyl radical of the alkanoic acid and/or acrylic or methacrylic acid alkyl esters with 4 to 18 carbon atoms in the alkyl radical, a dispersion was prepared with a polymer resin consisting of 92.3% by weight of vinyl acetate units and 3.0% by weight of crotonic acid units. The protective colloid/emulsifier system had the same composition as in Example 2.

EXAMPLE 4

(Comparative Example 2)

In order to demonstrate the superiority of the binders according to the invention over the dispersions disclosed in German Offenlegungsschrift No. 2,162,285, the latex described in Example 1 of German Offenlegungsschrift No. 2,162,285, page 8, was prepared.

The table which follows summarizes the values determined for each of the dispersions, these values resulting from the investigations described above.

TABLE

| | Elutability and wet tear strength of filter paper treated with the dispersions of Examples 1–4 | | | | | |
|---|---|---|---|---|---|---|
| | Elutability | | | | Wet tear strength Maximum tensile force N | |
| Dispersion according to Example No. | Amount of binder applied (%) | Loss of binder applied (%) | Amount of binder applied (%) | Dry | after 1 minute's storage in water | after 30 minutes' storage in water |
| 1 | 11.7 | 97.4 | 10.0 | 34.0 | 7.55 | 5.72 |
| 2 | 10.3 | 98.4 | 10.3 | 33.6 | 7.63 | 6.53 |
| 3 | 11.6 | 97.1 | 10.5 | 31.0 | 4.21 | 3.23 |
| 4 | 9.9 | 89.2 | 10.5 | 31.4 | 3.21 | 2.53 |
| Original filter paper | — | 1.6* | — | 12.5 | 2.14 | 1.99 |

*Loss in weight

The preceding specific embodiments are illustrative of the practice of the invention. It is to be understood however, that other expedients known to those skilled in the art or disclosed herein, may be employed without departing from the spirit of the invention or the scope of the appended claims.

We claim:

1. A cellulosic non-woven material containing from 2% to 25% by dry weight of the alkali-soluble, water-resistant in neutral to weakly acidic solutions, binder for cellulosic non-woven material consisting essentially of an aqueous vinyl acetate copolymer dispersion having a solids content of from 10% to 60% by weight and the following range of monomeric units:
   (1) 50% to 70% by weight of the monomer units of vinyl acetate units,
   (2) 20% to 35% by weight of the monomer units of higher molecular weight ethylenically-unsaturated ester units selected from the group consisting of vinyl esters of alkanoic acids having from 8 to 18 carbon atoms, alkyl esters having from 4 to 18 carbon atoms in the alkyl of acrylic acid, alkyl esters having from 4 to 18 carbon atoms in the alkyl of methacrylic acid, and mixtures thereof, and
   (3) 3% to 15% by weight of the monomer units of ethylenically-unsaturated acid units selected from the group consisting of alkenoic acids having 3 to 4 carbon atoms, alkendioic acids having 4 carbon atoms, alkyl monoesters having from 1 to 18 carbon atoms in the alkyl of alkenedioic acids having 4 carbon atoms, alkenyl monoesters having from 3 to 6 carbon atoms in the alkenyl of alkanedioic acids having 2 to 6 carbon atoms, and mixtures thereof,
and containing from 0.5% to 10% by weight, based on the monomer units, of protective colloids and from 0 to 6% by weight, based on the monomer units of emulsifiers, said binder being applied to said cellulosic non-woven material as an aqueous dispersion and subsequently dried.

2. The cellulosic non-woven material of claim 1 wherein said material has a filtering capacity.

3. The cellulosic non-woven material of claim 1 wherein, in said binder, said higher molecular weight ethylenically-unsaturated ester units of component (2) are selected from the group consisting of isononanoic acid vinyl ester, n-butyl acrylate and mixtures thereof.

4. The cellulosic non-woven material of claim 1 wherein, in said binder, said ethylenically-unsaturated acid units of component (3) is crotonic acid.

5. The cellulosic non-woven material of claim 1 wherein, in said binder, said protective colloids are selected from the group consisting of water-soluble hydroxyethylcellulose, polyvinyl alcohol having a hydrolysis degree of between 74 and 97 mol%, and mixtures thereof.

6. The cellulosic non-woven material of claim 1 wherein, in said binder, said higher molecular weight ethylenically-unsaturated ester units of component (2) are selected from the group consisting of isononanic acid vinyl esters, n-butyl acrylate and mixtures thereof, said ethylenically-unsaturated acid units of component (3) is crotonic acid and said protective colloid is selected from the group consisting of water-soluble hydroxyethylcellulose, polyvinyl alcohol having a hydrolysis degree of between 74 and 97 mol%, and mixtures thereof.

7. The cellulosic non-woven material of claim 6 wherein, in said binder, said ester units are n-butyl acrylate units.

8. The cellulosic non-woven material of claim 6 wherein, in said binder said ester units are isononanoic acid vinyl ester units.

* * * * *